United States Patent
Shin et al.

(10) Patent No.: US 10,966,585 B2
(45) Date of Patent: Apr. 6, 2021

(54) MOVING ROBOT AND CONTROLLING METHOD THEREOF

(71) Applicants: LG ELECTRONICS INC., Seoul (KR); SEOUL NATIONAL UNIVERSITY R&DB FOUNDATION, Seoul (KR)

(72) Inventors: Yongmin Shin, Seoul (KR); Donghoon Yi, Seoul (KR); Ilsoo Cho, Seoul (KR); Dongil Cho, Seoul (KR); Taejae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 15/994,698

(22) Filed: May 31, 2018

(65) Prior Publication Data
US 2018/0344115 A1    Dec. 6, 2018

(30) Foreign Application Priority Data

Jun. 1, 2017  (KR) .................. 10-2017-0068623

(51) Int. Cl.
*A47L 9/28* (2006.01)
*G06T 5/40* (2006.01)
(Continued)

(52) U.S. Cl.
CPC ........... *A47L 9/2852* (2013.01); *A47L 9/2805* (2013.01); *A47L 11/4011* (2013.01);
(Continued)

(58) Field of Classification Search
CPC ............ A47L 2201/00; A47L 2201/04; A47L 2201/06; G05D 1/0246; G06T 7/00;
(Continued)

(56) References Cited

U.S. PATENT DOCUMENTS 4,819,169 A * 4/1989 Saitoh ................. G05D 1/0246
                                                  180/168
4,933,864 A * 6/1990 Evans, Jr. ................ G01S 5/16
                                                  180/167
(Continued)

FOREIGN PATENT DOCUMENTS

EP    0 306 339     4/1990
EP    2 980 670     2/2016
(Continued)

OTHER PUBLICATIONS

Zhang et al., Vanishing Point Estimation and Line Classification in a Manhattan World with a Unifying Camera Model, Sep. 7, 2015, Springer (Year: 2015).*

(Continued)

*Primary Examiner* — Thomas G Black
*Assistant Examiner* — Sara J Lewandroski
(74) *Attorney, Agent, or Firm* — KED & Associates LLP (57) ABSTRACT

A cleaner includes a main body having a suction port, a cleaning unit provided in the main body to suck a cleaning object through the suction port, a driving unit moving the main body, a camera provided in the main body and photographing an image, and a controller detecting a vanishing point related to the image and detecting information related to a posture of the main body based on the detected vanishing point.

15 Claims, 7 Drawing Sheets

(51) Int. Cl.
  *G06T 7/50* (2017.01)
  *G05D 1/02* (2020.01)
  *A47L 11/40* (2006.01)

(52) U.S. Cl.
  CPC ......... *G05D 1/0238* (2013.01); *G05D 1/0246* (2013.01); *G06T 5/40* (2013.01); *G06T 7/50* (2017.01); *A47L 2201/04* (2013.01); *G06T 2207/30244* (2013.01); *G06T 2207/30252* (2013.01); *Y10S 901/01* (2013.01)

(58) Field of Classification Search
  CPC .. G06T 7/13; G06T 7/20; G06T 7/246; G06T 7/536; G06T 7/70; G06T 7/73; G06T 7/74; G06T 7/75; G06T 7/77
  See application file for complete search history.

(56) References Cited

U.S. PATENT DOCUMENTS

| | | | | |
|---|---|---|---|---|
| 5,051,906 A | * | 9/1991 | Evans, Jr. | G01S 5/16 701/28 |
| 5,638,116 A | * | 6/1997 | Shimoura | G05D 1/0246 348/118 |
| 6,091,833 A | * | 7/2000 | Yasui | G05D 1/0246 382/104 |
| 6,459,955 B1 | * | 10/2002 | Bartsch | A47L 9/00 700/245 |
| 2007/0165909 A1 | * | 7/2007 | Leleve | G06T 7/80 382/104 |
| 2014/0333615 A1 | * | 11/2014 | Ramalingam, Sr. | G06T 17/00 345/420 |
| 2016/0037032 A1 | * | 2/2016 | Iwama | H04N 5/2253 348/148 |
| 2016/0052133 A1 | | 2/2016 | Kim et al. | |
| 2017/0069092 A1 | * | 3/2017 | Bell | G06K 9/4671 |
| 2018/0344115 A1 | * | 12/2018 | Shin | A47L 9/2852 |
| 2019/0347878 A1 | * | 11/2019 | Kanou | G05D 1/027 |

FOREIGN PATENT DOCUMENTS

| | | |
|---|---|---|
| KR | 10-1339449 | 12/2013 |
| WO | WO 01/037060 | 5/2001 |

OTHER PUBLICATIONS

European Search Report dated Oct. 26, 2018 issued in Application No. 18175507.5.
Korean Office Action dated Nov. 20, 2018 issued in Application No. 10-2017-0068623.

* cited by examiner

MOVING ROBOT AND CONTROLLING METHOD THEREOF

CROSS-REFERENCE TO RELATED APPLICATION

Pursuant to 35 U.S.C. § 119(a), this application claims the benefit of earlier filing date and right of priority to Korean Application No. 10-2017-0068623, filed on Jun. 1, 2017, the contents of which is incorporated by reference herein in its entirety.

BACKGROUND OF THE DISCLOSURE

1. Field of the Disclosure

The present disclosure relates to a robot performing autonomous traveling and a controlling method thereof, and particularly, to a robot performing a cleaning function during autonomous travelling and a controlling method thereof.

2. Background of the Disclosure

Generally, a robot has been developed for an industrial purpose and has been in charge of part of factory automation. Recently, robot-applied fields have further extended to develop medical robots or aerospace robots, and home robots that may be used in general houses have also been made.

A typical example of home robots is a robot cleaner, which is a sort of a home appliance for performing cleaning by sucking ambient dust or foreign objects, while traveling in a predetermined area. Such a robot cleaner includes a generally rechargeable battery and has an obstacle sensor capable of avoiding an obstacle during traveling so that the robot cleaner may perform cleaning, while traveling.

Recently, beyond performing cleaning while robot cleaners are simply autonomously traveling in a cleaning area, research into utilization of robot cleaners in various fields such as healthcare, smart home, remote control, and the like, has been actively conducted.

SUMMARY OF THE DISCLOSURE

Therefore, an aspect of the detailed description is to provide a cleaner performing autonomous traveling, which is capable of detecting information related to a posture of a robot using only a monocular camera or one camera, and a controlling method thereof.

Another object of the present disclosure is to provide a cleaner performing autonomous traveling, which is capable of detecting information related to a posture of a main body of a robot using only a single camera, regardless of a material of a floor in which the robot is positioned, and a controlling method thereof.

Another object of the present disclosure is to provide a cleaner performing autonomous traveling, which is capable of detecting information related to a posture of a main body of a robot without using expensive equipment such as a laser sensor and without increasing the number of cameras, and a controlling method thereof.

Another object of the present disclosure is to provide a cleaner performing autonomous traveling, which is capable of detecting information related to a posture of a main body of a robot using only one camera, regardless of characteristics of a place where the robot is positioned, and a controlling method thereof.

Another object of the present disclosure is to provide a cleaner performing autonomous traveling, which is capable of detecting information related to a posture of a main body of a robot using an image acquired from one camera even in an environment in which the grain of a floor of a region in which the robot is positioned is not seen, and a controlling method thereof.

To achieve these and other advantages and in accordance with the purpose of this specification, as embodied and broadly described herein, a cleaner includes: a main body having a suction port; a cleaning unit provided in the main body to suck a cleaning object through the suction port; a driving unit moving the main body; a camera provided in the main body and photographing an image; and a controller detecting a vanishing point related to the image and detecting information related to a posture of the main body based on the detected vanishing point.

In an embodiment, the controller may detect a plurality of line segments from the image and detect a vanishing point related to the image using the plurality of detected line segments.

In an embodiment, the controller may classify the plurality of detected line segments into three groups based on a preset three-dimensional (3D) coordinate system, and detect coordinate information of a vanishing point corresponding to each group using the line segments included in each group.

In an embodiment, the coordinate information of the vanishing point may be two-dimensional (2D) coordinate information.

In an embodiment, the controller may use a random sample consensus (RANSAC) algorithm to classify the plurality of line segments.

In an embodiment, the three groups correspond to coordinate axes of the 3D coordinate system, respectively.

In an embodiment, the controller may detect a vanishing point vector corresponding to each group using coordinate information of the vanishing point corresponding to each group.

In an embodiment, the vanishing point vector may be 3D information.

In an embodiment, the controller may calculate an angle formed by any one of the vanishing point vectors corresponding to each group and a moving direction of the main body.

In an embodiment, the controller may select any one of the vanishing point vectors corresponding to each group based on a normal vector of a wall surface located in the moving direction of the main body, and calculate an angle formed by the selected vanishing point vector and the moving direction of the main body.

In an embodiment, the selected vanishing point vector may form a predetermined angle with the normal vector of the wall surface.

In an embodiment, the controller may select any one vanishing point vector having a largest horizontal direction vector component of the image among the vanishing point vectors corresponding to each group, and calculate an angle formed by the selected vanishing point vector and the moving direction of the main body.

In an embodiment, the preset 3D coordinate system may be defined by a direction in which an optical axis of the camera is directed.

In an embodiment, the controller may compare a global coordinate system corresponding to a cleaning region in which the main body is located and the preset 3D coordinate system, and detect a direction in which the main body is directed on the global coordinate system on the basis of the comparison result and the vanishing point coordinate information.

In an embodiment, the controller may perform histogram equalizing on the image before detecting the vanishing point.

In an embodiment, the camera may be installed at one point of the main body such that the direction in which the optical axis of the camera is directed is fixed According to the present disclosure, since an obstacle may be detected using only one camera, manufacturing cost of the robot cleaner may be reduced.

Also, in the robot cleaner according to the present disclosure, performance of obstacle detection may be enhanced using one camera.

Also, in the robot cleaner according to the present disclosure, an obstacle may be effectively detected using one camera in various indoor environments.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, embodiments of the present invention will be described in detail with reference to the accompanying drawings. The technical terms used in the present specification are set forth to mention specific embodiments of the present invention, and do not intend to define the scope of the present invention.

Figure 1:
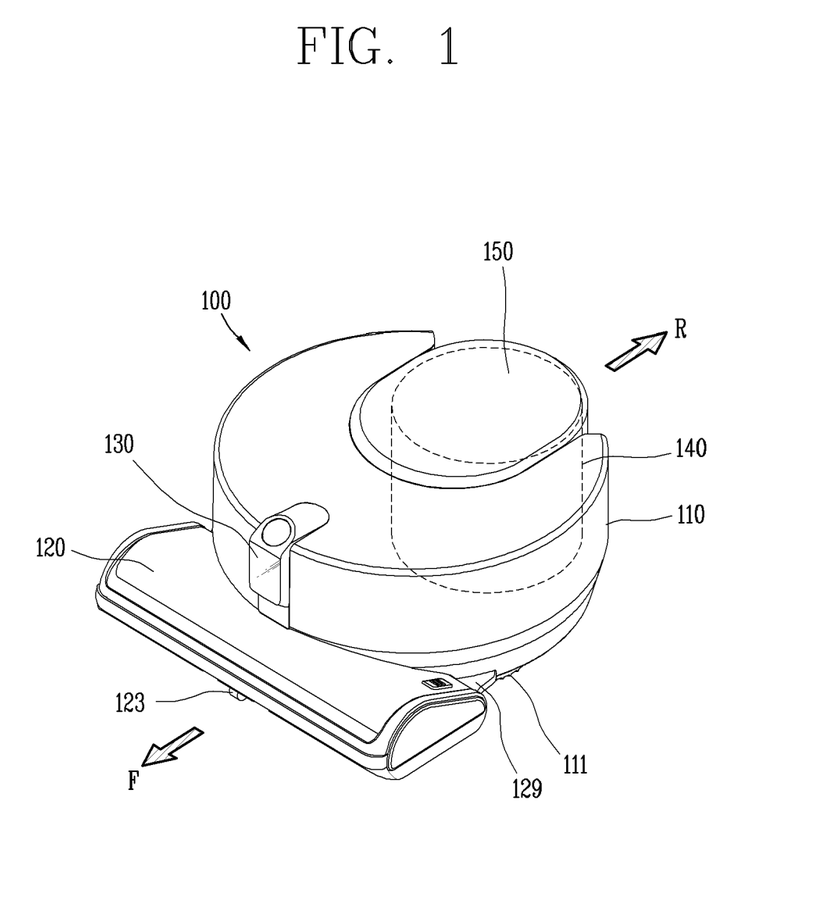
FIG. 1 is a perspective view illustrating an example of a cleaner according to the present invention.
Figure 2:
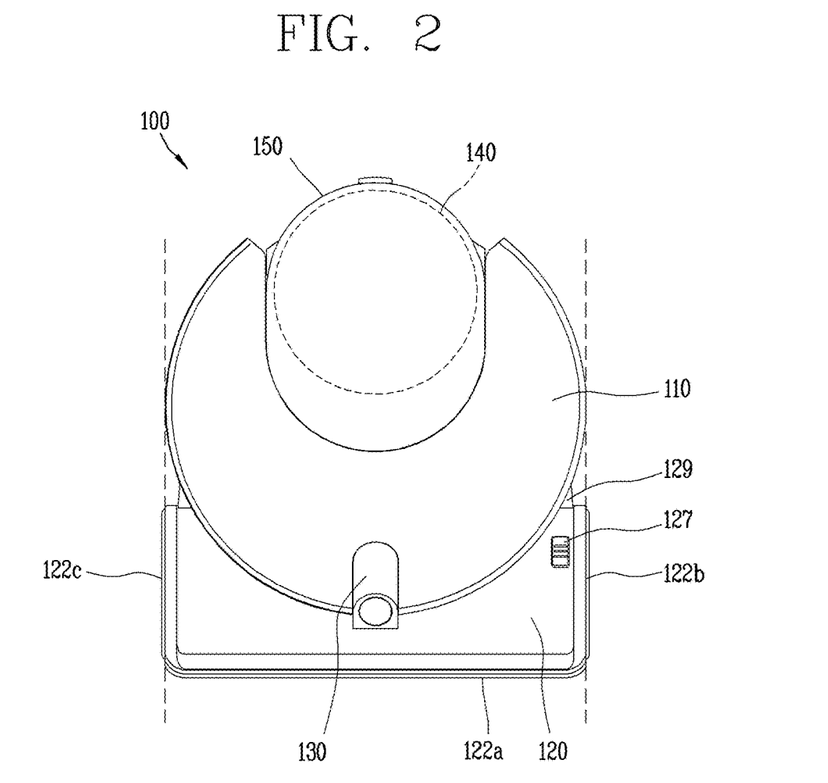
FIG. 2 is a plan view of the cleaner illustrated in FIG. 1.
Figure 3:
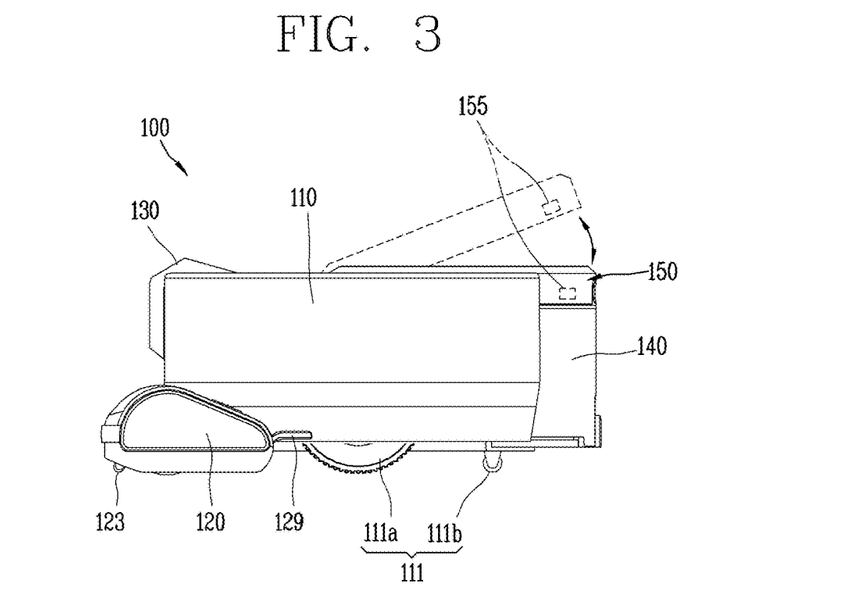
FIG. 3 is a side view of the cleaner illustrated in FIG. 1.

FIG. 1 is a perspective view illustrating an example of a robot cleaner 100 according to the present invention, FIG. 2 is a plan view of the robot cleaner 100 illustrated in FIG. 1, and FIG. 3 is a side view of the robot cleaner 100 illustrated in FIG. 1.

For reference, in this disclosure, a moving robot, a robot cleaner, and a cleaner performing autonomous traveling may be used to have the same meaning.

Referring to FIGS. 1 to 3, the robot cleaner 100 performs a function of cleaning a floor, while traveling a predetermined area by itself. Here, cleaning the floor includes sucking dust (including a foreign material) of the floor and wiping the floor.

The robot cleaner 100 includes a cleaner main body 110, a suction unit 120, a sensing unit 130, and a dust box 140.

A controller (not shown) for controlling the robot cleaner 100 and a wheel unit 111 for causing the robot cleaner 100 to travel are provided in the cleaner main body 110. The robot cleaner 100 may be moved or rotated in every direction by the wheel unit 111.

The wheel unit 111 includes a main wheel 111a and a sub-wheel 111b.

The main wheel 111a is provided on both sides of the cleaner main body 110 and is rotatable in one direction or in the other direction according to a control signal from the controller. Each main wheel 111a may be configured to be driven mutually independently. For example, each main wheel 111a may be driven by different motors.

The sub-wheel 111b supports the cleaner main body 110 with the main wheel 111a and assists traveling of the robot cleaner 100 by the main wheel 111a. The sub-wheel 111b may also be provided in the suction unit 120 described hereinafter.

As described above, as the controller controls driving of the wheel unit 111, the robot cleaner 100 may autonomously travel on the floor.

Meanwhile, a battery (not shown) supplying power to the robot cleaner 100 is installed in the cleaner main body 110. The battery may be rechargeable and may be detachably provided on a bottom surface part of the cleaner main body 110.

The suction unit 120 is disposed to protrude from one side of the cleaner main body 110 and suck air including dust. The one side may be a side in which the cleaner main body 110 travels in a forward direction (F), that is, a front side of the cleaner main body 110.

In this drawing, it is illustrated that the suction unit 120 protrudes from one side of the cleaner main body 110 to the front side and to the left and right sides. In detail, a front end portion of the suction unit 120 is disposed in a position spaced apart from one side of the cleaner main body 110 forwards, and left and right end portions of the suction unit 120 are disposed in positions spaced apart from one side of the cleaner main body 110 leftwards and rightwards.

As the cleaner main body 110 has a circular shape and both sides of a rear end portion of the suction unit 120 protrude to both left and right sides of the cleaner main body 110, an empty space, i.e., a gap, may be formed between the cleaner main body 110 and the suction unit 120. The empty space may be a space between left and right end portions of the cleaner main body 110 and left and right end portions of the suction unit 120, and has a shape recessed to an inner side of the robot cleaner 100.

If an obstacle is caught in the empty space, the robot cleaner 100 may be caught by the obstacle and cannot move. In order to prevent this, the cover member 129 may be disposed to cover at least a portion of the empty space. The cover member 129 may be provided in the cleaner main body 110 or the suction unit 120. In this embodiment, the cover member 129 protrudes from both sides of a rear end portion of the suction unit 120 and covers an outer circumferential surface of the cleaner main body 110.

The cover member 129 is disposed to fill the empty space, i.e., at least a portion of the empty space between the cleaner main body 110 and the suction unit 120. Thus, an obstacle is prevented from being caught in the empty space, or although an obstacle is caught in the empty space, the robot cleaner may be easily released from the obstacle.

The cover member 129 protruding from the suction unit 120 may be supported by an outer circumferential surface of the cleaner main body 110. When the cover member 129 protrudes from the cleaner main body 110, the cover member 129 may be supported by a rear surface portion of the suction unit 120. According to the structure, when the suction unit 120 collides with an obstacle, a partial amount of the impact may be transmitted to the cleaner main body 110 such that the impact is distributed.

The suction unit 120 may be detachably coupled to the cleaner main body 110. When the suction unit 120 is separated from the cleaner main body 110, a cloth module (not shown) may be detachably coupled to the cleaner main body 110. Thus, when the user wants to remove dust from a floor, the user may attach the suction unit 120 to the cleaner main body 110, and when the user wants to wipe the floor, the user may attach the cloth module to the cleaner main body 110.

When the suction unit 120 is mounted in the cleaner main body 110, mounting of the suction unit 120 may be guided by the aforementioned cover member 129. That is, since the cover member 129 is disposed to cover an outer circumferential surface of the cleaner main body 110, a relative position of the suction unit 120 with respect to the cleaner main body 110 may be determined.

The sensing unit 130 is disposed in the cleaner main body 110. As illustrated, the sensing unit 130 may be disposed on one side of the cleaner main body 110 where the suction unit 120 is positioned, i.e., on the front side of the cleaner main body 110.

The sensing unit 130 may be disposed to overlap the suction unit 120 in a vertical direction of the cleaner main body 110. The sensing unit 130 may be disposed above the suction unit 120 to sense an obstacle, a geographic feature, and the like, in front of the robot cleaner 100 such that the suction unit 120 positioned on the forefront may not collide with the obstacle.

The sensing unit 130 is configured to additionally perform another sensing function in addition to such sensing (or detection) function. This will be described in detail hereinafter.

A dust box accommodation part 113 is provided in the cleaner main body 110, and a dust box 140 separately collecting dust in sucked air is detachably coupled to the dust box accommodation part 113. As illustrated, the dust box accommodation part 113 may be provided on the other side of the cleaner main body 110, i.e., on the rear of the cleaner main body 110.

A portion of the dust box 140 may be accommodated in the dust box accommodation part 113 while another portion of the dust box 140 may protrude toward a rear side (that is, a reverse direction (R) opposite to a forward direction (F)) of the cleaner main body 110.

An inlet 140a, to which air including dust is introduced, and an outlet 140b, from which air separated from dust is discharged, are provided in the dust box 140. When the dust box 140 is installed in the dust box accommodation part, the inlet 140a and the outlet 140b communicate with a first opening 110a and a second opening 110b provided on an inner side wall of the dust box accommodation part.

An intake flow channel inside the cleaner main body 110 corresponds to a flow channel from an inlet (not shown) communicating with a communication part 120b" to the first opening 110a, and an exhaust flow channel corresponds to a flow channel from the second opening 110b to an exhaust 112.

According to the connection relationship, air including dust introduced through the suction unit 120 is introduced to the dust box 140 through the intake flow channel within the cleaner main body 110 and air and dust are separated from each other through a filter or cyclone of the dust box 140. Dust is collected by the dust box 140 and air is discharged from the dust box 140, passes through an exhaust flow channel within the cleaner main body 110, and is finally discharged to the outside through the exhaust 112.

Figure 4:
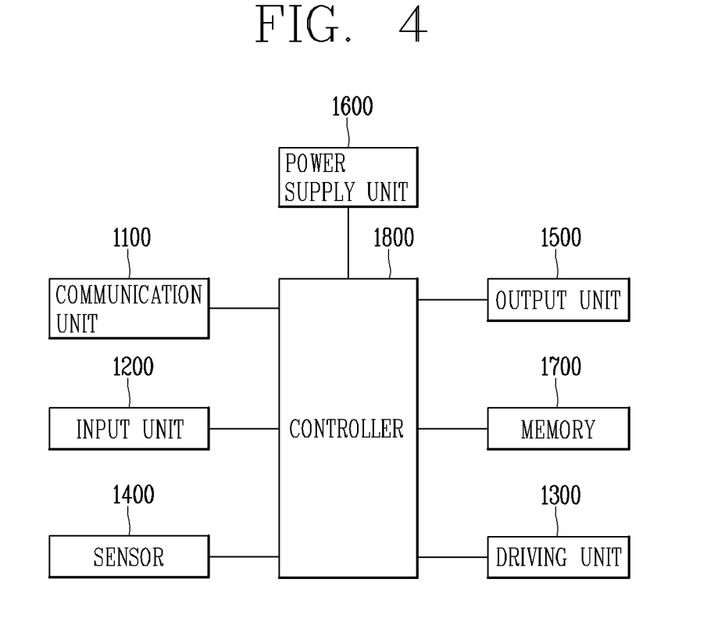
FIG. 4 is a block diagram illustrating components of a cleaner according to an embodiment of the present invention.

An embodiment related to components of the robot cleaner 100 is described in FIG. 4.

The robot cleaner 100 or the moving robot according to an embodiment of the present invention may include at least one of a communication unit 1100, an input unit 1200, a driving unit 1300, a sensing unit 1400, an output unit 1500, a power supply unit 1600, a memory 1700, and a controller 1800, and any combination thereof.

Here, the components illustrated in FIG. 4 are not essential and a robot cleaner including greater or fewer components may be implemented. Hereinafter, the components will be described.

First, the power supply unit 1600 includes a battery that may be charged by external commercial power and supplies power to the inside of the moving robot. The power supply unit 1600 may supply driving power to each of the components included in the moving robot to provide operation power required for the moving robot to travel (or move or run) or perform a specific function.

Here, the controller 1800 may detect a remaining capacity of power of the battery, and when the remaining capacity of power is insufficient, the controller 1800 controls the moving robot to move to a charging station connected to an external commercial power so that the battery may be charged upon receiving a charge current from the charging station. The battery may be connected to a battery sensing unit and a remaining battery capacity and a charging state thereof may be transmitted to the controller 1800. The output unit 1500 may display a remaining battery capacity on a screen by the controller 1800.

The battery may be positioned on a lower side of the center of the robot cleaner or may be positioned on one of left and right sides. In the latter case, the moving robot may further include a balance weight (or a counter weight) in order to resolve weight unbalance of the battery.

Meanwhile, the driving unit 1300 may include a motor and drive the motor to rotate left and right main wheels of the main body of the moving robot in both directions to rotate or move the main body. The driving unit 1300 may move the main body of the moving robot forwards/backwards and leftwards/rightwards, or enable the main body of the moving robot to travel in a curved manner or rotate in place.

Meanwhile, the input unit 1200 receives various control commands regarding the robot cleaner from a user. The input unit 1200 may include one or more buttons, for example, an OK button, a setting button, and the like. The OK button is a button for receiving a command for checking detection information, obstacle information, position information, and map information from the user, and the setting button may be a button for receiving a command for setting the aforementioned types of information from the user.

Also, the input unit 1200 may include an input resetting button for canceling a previous user input and receiving a user input again, a delete button for deleting a preset user input, a button for setting or changing an operation mode, or a button for receiving a command for returning to the charging station.

Also, the input unit 1200 may be installed in an upper portion of the moving robot, as a hard key, a soft key, or a touch pad. Also, the input unit 1200 may have a form of a touch screen together with the output unit 1500.

Meanwhile, the output unit 1500 may be installed in an upper portion of the moving robot. An installation position or an installation form thereof may be varied. For example, the output unit 1500 may display a battery state or a traveling scheme.

Also, the output unit 1500 may output information regarding a state of an interior of the moving robot detected by the sensing unit 1400, for example, a current state of each component included in the moving robot. Also, the output unit 1500 may display external state information, obstacle information, position information, and map information detected by the sensing unit 1400 on a screen. The output unit 1500 may be configured as at least one device among a light emitting diode (LED), a liquid crystal display (LCD), a plasma display panel (PDP), an organic light emitting diode (OLED).

The output unit 1500 may further include a sound output unit audibly outputting an operational process or an operation result of the moving robot performed by the controller 1800. For example, the output unit 1500 may output a warning sound outwardly according to a warning signal generated by the controller 1800.

Here, the sound output unit may be a unit for outputting a sound, such as a beeper, a speaker, and the like, and the output unit 1500 may output audio data or message data having a predetermined pattern stored in the memory 1700 through the sound output unit.

Thus, the moving robot according to an embodiment of the present invention may output environment information regarding a traveling region on a screen or output it as a sound through the output unit 1500. Also, according to another embodiment, the moving robot may transmit map information or environment information to a terminal device through the communication unit 1100 such that the terminal device may output a screen or a sound to be output through the output unit 1500.

Meanwhile, the communication unit 1100 may be connected to the terminal device and/or a different device positioned within a specific region (which will be used together with a "home appliance" in this disclosure) according to one communication scheme among wired, wireless, and satellite communication schemes to transmit and receive data.

The communication unit 1100 may transmit and receive data to and from a different device positioned within a specific region. Here, the different device may be any device as long as it may be connected to a network and transmit and receive data. For example, the different device may be a device such as an air-conditioner, a heating device, an air purifier, a lamp, a TV, an automobile, and the like. Also, the different device may be a device for controlling a door, a window, a plumbing valve, a gas valve, and the like. Also, the different device may be a sensor sensing a temperature, humidity, atmospheric pressure, a gas, and the like.

Meanwhile, the memory 1700 stores a control program controlling or driving the robot cleaner and data corresponding thereto. The memory 1700 may store audio information, image information, obstacle information, position information, map information, and the like. Also, the memory 1700 may store information related to a traveling pattern.

As the memory 1700, a non-volatile memory is commonly used. Here, the non-volatile memory (NVM) (or NVRAM) is a storage device capable of continuously maintaining stored information even though power is not applied thereto. For example, the memory 1700 may be a ROM, a flash memory, a magnetic computer storage device (for example, a hard disk or a magnetic tape), an optical disk drive, a magnetic RAM, a PRAM, and the like.

Meanwhile, the sensor 1400 may substantially correspond to the sensing unit 130 shown in FIG. In addition, the sensor 1400 may include at least one of an external signal detection sensor, a front detection sensor, a cliff detection sensor, a lower camera sensor, an upper camera sensor, and a three-dimensional (3D) camera sensor.

The external signal sensor may sense an external signal of the moving robot. The external signal sensor may be, for example, an infrared sensor, an ultrasonic sensor, an RF sensor, and the like.

The moving robot may check a position and a direction of the charging station upon receiving a guide signal generated by the charging station using the external signal sensor. Here, the charging station may transmit the guide signal indicating a direction and a distance such that the moving robot may be returned. That is, upon receiving the signal transmitted from the charging station, the moving robot may determine a current position and set a movement direction to return to the charging station.

Meanwhile, the front sensor may be installed at a predetermined interval on a front side of the moving robot, specifically, along an outer circumferential surface of a side surface of the moving robot. The front sensor may be positioned on at least one side surface of the moving robot to sense an obstacle ahead. The front sensor may sense an object, in particular, an obstacle, present in a movement direction of the moving robot and transfer detection information to the controller 1800. That is, the front sensor may sense a protrusion present in a movement path of the moving robot, furnishings, furniture, a wall surface, a wall corner, and the like, in a house, and transmit corresponding information to the controller 180.

The front sensor may be, for example, an infrared sensor, an ultrasonic sensor, an RF sensor, a geomagnetic sensor, and the like, and the moving robot may use one kind of sensor or two or more kinds of sensors together as the front sensor.

For example, in general, the ultrasonic sensor may be mainly used to sense an obstacle in a remote area. The ultrasonic sensor may include a transmission unit and a reception unit. The controller 1800 may determine whether an obstacle is present according to whether an ultrasonic wave radiated through the transmission unit is reflected by an obstacle, or the like, and received by the reception unit, and calculate a distance to the obstacle by using an ultrasonic wave radiation time and an ultrasonic wave reception time.

Also, the controller 1800 may detect information related to a size of an obstacle by comparing an ultrasonic wave radiated from the transmission unit and an ultrasonic wave received by the reception unit. For example, as a larger amount of ultrasonic waves is received by the reception unit, the controller 1800 may determine that the size of the obstacle is larger.

In one embodiment, a plurality of ultrasonic sensors (for example, five ultrasonic sensors) may be installed on an outer circumferential surface of a front side of the moving robot. Here, preferably, the transmission units and the reception units of the ultrasonic sensors may be installed alternately on the front side of the moving robot.

That is, the transmission units may be disposed to be spaced apart from the center of the front side of the main body of the moving robot, and in this case, one or two or more transmission units may be disposed between reception units to form a reception region of an ultrasonic signal reflected from the obstacle, or the like. Due to this disposition, a reception region may be expanded, while reducing the number of sensors. A transmission angle of ultrasonic waves may be maintained at an angle of a range which does not affect other signals to prevent a crosstalk phenomenon. Also, reception sensitivity of the reception units may be set to be different.

Also, the ultrasonic sensors may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided.

Meanwhile, as mentioned above, two or more kinds of sensors may be used as the front sensors, and thus, any one kind of sensors among an infrared sensor, an ultrasonic sensor, and an RF sensor may be used as the front sensors.

For example, the front sensor may include an infrared sensor as another kind of sensor, in addition to the ultrasonic sensor.

The infrared sensor may be installed on an outer circumferential surface of the moving robot together with the ultrasonic sensor. The infrared sensor may also sense an obstacle present in front of or by the side of the moving robot and transmit corresponding obstacle information to the controller 1800. That is, the infrared sensor may sense a protrusion present in a movement path of the moving robot, furnishings, furniture, a wall surface, a wall corner, and the like, in a house, and transmit corresponding information to the controller 1800. Thus, the moving robot may move within a cleaning area without colliding with an obstacle.

Meanwhile, as the cliff sensor, various types of optical sensors may be used, and the cliff sensor may sense an obstacle on the floor supporting the main body of the moving robot.

That is, the cliff sensor may be installed on a rear surface of the moving robot 100 and may be installed in different regions depending on a kind of a moving robot. The cliff sensor may be positioned on a rear surface of the moving robot to sense an obstacle on the floor. The cliff sensor may be an infrared sensor including a light emitting unit and a light receiving unit, an ultrasonic sensor, an RF signal, a position sensitive detector (PSD) sensor, and the like, like the obstacle sensor.

For example, any one of cliff sensors may be installed on the front side of the moving robot, and the other two cliff sensors may be installed on a relatively rear side.

For example, the cliff sensor may be a PSD sensor or may include a plurality of different kinds of sensor.

The PSD sensor detects the positions of the short and long distances of an incident light with a single p-n junction by using the surface resistance of a semiconductor. The PSD sensor includes a 1D PSD sensor that detects light on a single axis and a 2D PSD sensor that may detect the position of light on the surface, and they have a pin photodiode structure. The PSD sensor is a type of infrared sensor which transmits an infrared ray to an obstacle and measures an angle between the infrared ray transmitted to the obstacle an infrared ray returned after being reflected from the obstacle, thus measuring a distance therebetween. That is, the PSD sensor calculates a distance to the obstacle using triangulation.

The PSD sensor includes a light emitting unit emitting infrared light to an obstacle and a light receiving unit receiving infrared light returned after being reflected from the obstacle. In general, the PSD sensor is formed as a module. If an obstacle is sensed by using the PSD sensor, a stable measurement value may be obtained regardless of difference in reflectivity or color of the obstacle.

The controller 1800 may measure an angle between an infrared light emitting signal irradiated by the cliff sensor toward the floor and a reflection signal received after being reflected from the obstacle to sense a cliff, and analyze a depth thereof.

Meanwhile, the controller 1800 may determine whether the moving robot may be able to pass through a cliff according to a floor state of the cliff sensed by using the cliff sensor. For example, the controller 1800 may determine whether a cliff is present and a depth of the cliff through the cliff sensor and only when a reflection signal is sensed by the cliff sensor, the controller 1800 allows the moving robot to pass through the cliff.

In another example, the controller 1800 may determine whether the moving robot is lifted using the cliff sensor.

Meanwhile, the lower camera sensor may be provided on a rear surface of the moving robot and obtain image information related to the lower side, i.e., the floor (or a cleaning target surface) during movement. The lower camera sensor is also called an optical flow sensor. The lower camera sensor may convert an image of the lower side input from an image sensor provided therein to generate a predetermined format of image data. The generated image data may be stored in the memory 1700.

Also, one or more light sources may be installed to be adjacent to the image sensor. One or more light sources irradiate light to a predetermined region of the floor captured by the image sensor. Namely, if the moving robot moves a cleaning region along the floor, when the floor is smooth, a predetermined distance is maintained between the image sensor and the floor. On the other hand, if the moving robot moves on the floor which is uneven, the image sensor may become away from the floor by a predetermined distance or greater due to depressions and protrusions and an obstacle of the floor. In this case, the one or more light sources may be controlled by the controller 1800 such that an amount of irradiated light may be adjusted. The light sources may be a light emitting device, for example, a light emitting diode (LED), or the like, whose amount of light may be adjusted.

The controller 1800 may detect a position of the moving robot regardless of whether the moving robot slides by using the lower camera sensor. The controller 1800 may compare and analyze image data captured by the lower camera sensor over time to calculate a movement distance and a movement direction, and calculate a position of the moving robot on the basis of the calculated movement distance and the calculated movement direction. By using the image information regarding the lower side of the moving robot using the lower camera sensor, the controller 1800 may perform correction resistant to sliding with respect to a position of the moving robot calculated by other means.

Meanwhile, the upper camera sensor may be installed to face an upper side or a front side of the moving robot to image surroundings of the moving robot. When the moving robot includes a plurality of upper camera sensors, the camera sensors may be formed on the upper portion or side surface of the moving robot at a certain distance or at a certain angle.

The 3D camera sensor may be attached to one side or a part of the main body of the moving robot to generate 3D coordinate information related to the surroundings of the main body.

That is, the 3D camera sensor may be a 3D depth camera that calculates a remote or near distance of the moving robot and an object to be photographed.

Specifically, the 3D camera sensor may capture a two-dimensional (2D) image related to the surroundings of the main body, and may generate a plurality of pieces of 3D coordinate information corresponding to the captured 2D image.

In one embodiment, the 3D camera sensor may be formed in a stereoscopic vision manner by including two or more cameras that acquire a conventional 2D image, and combine two or more images acquired from the two or more cameras to generate 3D coordinate information.

Specifically, the 3D camera sensor according to the embodiment may include a first pattern irradiating unit for irradiating light of a first pattern downwards to the front side of the main body, a second pattern irradiating unit for irradiating light of a second pattern upwards to the front side of the main body, and an image acquiring unit acquiring an image of the front side of the main body. Thus, the image acquiring unit may acquire an image of a region where light of the first pattern and light of the second pattern are incident.

In another embodiment, the 3D camera sensor includes an infrared ray pattern emitting unit for irradiating an infrared ray pattern together with a single camera, and captures a shape of an infrared ray pattern irradiated from the infrared ray pattern emitting unit onto the object to be photographed, thus measuring a distance between the 3D camera sensor and the object to be photographed. Such a 3D camera sensor may be an infrared (IR) type 3D camera sensor.

In another embodiment, the 3D camera sensor may include a light emitting unit that emits light together with a single camera, receive a part of a laser emitted from the light emitting unit and reflected from the object, and analyze the received laser, to measure a distance between the camera sensor and the object to be photographed. The 3D camera sensor may be a time-of-flight (TOF) type 3D camera sensor.

Specifically, the laser of the above-described 3D camera sensor is configured to irradiate a laser extending in at least one direction. In one example, the 3D camera sensor may include first and second lasers, and the first laser may irradiate linear lasers intersecting each other, and the second laser may irradiate a single linear laser. According to this, a lowermost laser is used to detect an obstacle in the bottom part, an uppermost laser is used to detect an obstacle in an upper part, and an intermediate laser between the lowermost laser and the uppermost laser is used to detect an obstacle in the middle part.

Meanwhile, the camera sensor may be installed to face an upper side or a front side of the moving robot to image surroundings of the moving robot. The camera sensor installed to face the upper side or the front side of the moving robot may be defined as an upper camera sensor. When the moving robot includes a plurality of upper camera sensors, the camera sensors may be formed on the upper portion or side surface of the moving robot at a certain distance or at a certain angle.

The upper camera sensor may further include a lens for adjusting a focal point of a subject, an adjusting unit for adjusting the camera sensor, and a lens adjusting unit for adjusting the lens. As the lens, a lens having a wide angle of view may be used such that every surrounding region, for example, the entire region of the ceiling, may be photographed even at a predetermined position. For example, the lens may include a lens having an angle equal to or greater than a predetermined angle of view, for example, equal to or greater than 160 degrees.

The controller 1800 may recognize a position of the moving robot using image data captured by the upper camera sensor, and create map information regarding a specific region. The controller 1800 may precisely recognize a position by using image data acquired by the acceleration sensor, the gyro sensor, the wheel sensor, and the lower camera sensor and the image data acquired by the upper camera sensor.

Also, the controller 1800 may generate map information by using the obstacle information detected by the front sensor, the obstacle sensor, and the like, and the position recognized by the upper camera sensor. Alternatively, the map information may be received from the outside and stored in the storage unit 1700, rather than being created by the controller 1800.

In an embodiment, the upper camera sensor may be installed to face a front side of the moving robot. Also, an installation direction of the upper camera sensor may be fixed or may be changed by the controller 1800.

Figure 5:
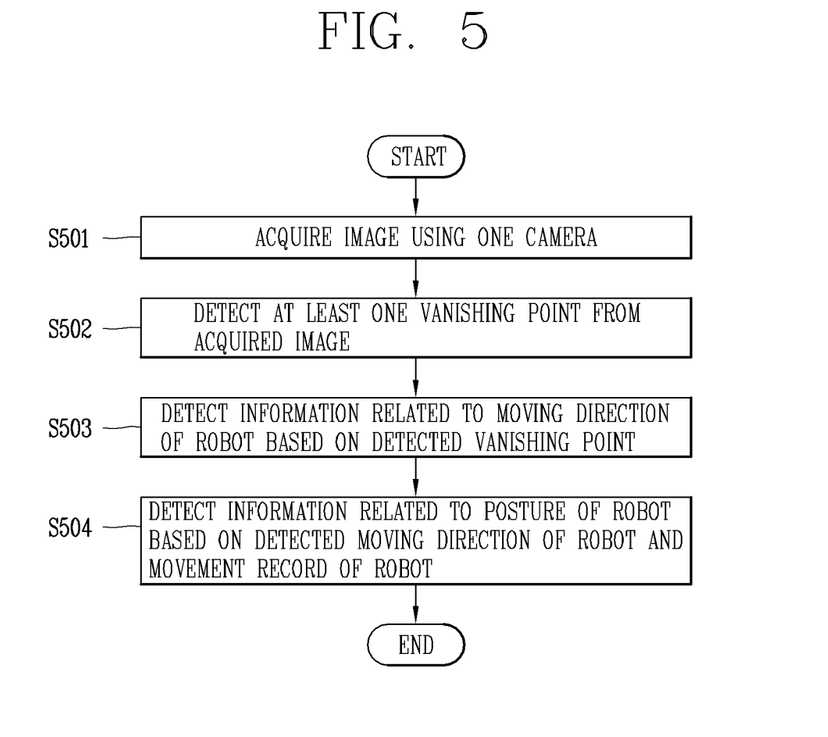
FIG. 5 is a flow chart illustrating a method of controlling a moving robot according to an embodiment of the present disclosure.

An embodiment related to a controlling method of a robot according to the present disclosure will be described with reference to FIG. 5.

First, the controller 1800 may acquire an image using one camera installed at one point of the main body (S501).

Meanwhile, the one camera may correspond to the above-mentioned camera sensor. Although not shown in FIGS. 1 to 4, the robot cleaner 100 may include a lighting unit together with a camera. The lighting unit may irradiate a light source in a direction in which an optical axis of the camera is oriented or in a region in which a subject of the camera exists.

In one example, the one camera may be a monocular camera fixedly installed in the main body of the robot cleaner 100. That is, the camera sensor 144 may photograph an image in a fixed direction with respect to a moving direction of the main body.

The controller 1800 may acquire images using the camera at predetermined time intervals. In addition, the controller 1800 may acquire an image using the camera every time the main body moves a predetermined distance.

The controller 1800 may detect at least one vanishing point from the image acquired by one camera (S502).

Here, the vanishing point means a point where straight lines which are actually parallel to each other meet when the straight lines extend to a distance on a protective view. The controller 1800 may infinitely extend straight lines parallel to each other in a 3D space corresponding to the image acquired by the camera, which is 2D information, and detect a point where the extended straight lines meet when the extended straight lines are projected onto the image acquired by the camera, as a vanishing point.

Specifically, the controller 1800 may detect a plurality of line segments from the image, and detect a vanishing point related to the image using the plurality of detected line segments.

In one embodiment, the controller 1800 may classify the plurality of detected line segments into three groups based on a preset 3D coordinate system. The controller 1800 may detect coordinate information of the vanishing point corresponding to each group by using the line segments included in each group.

In more detail, the controller 1800 may detect three vanishing points so as to correspond to three coordinate axes forming the preset 3D coordinate system. At this time, the preset 3D coordinate system may be defined by a camera provided in the robot. For example, any one of the coordinate axes of the preset 3D coordinate system may correspond to an optical axis of the camera.

Figure 9:
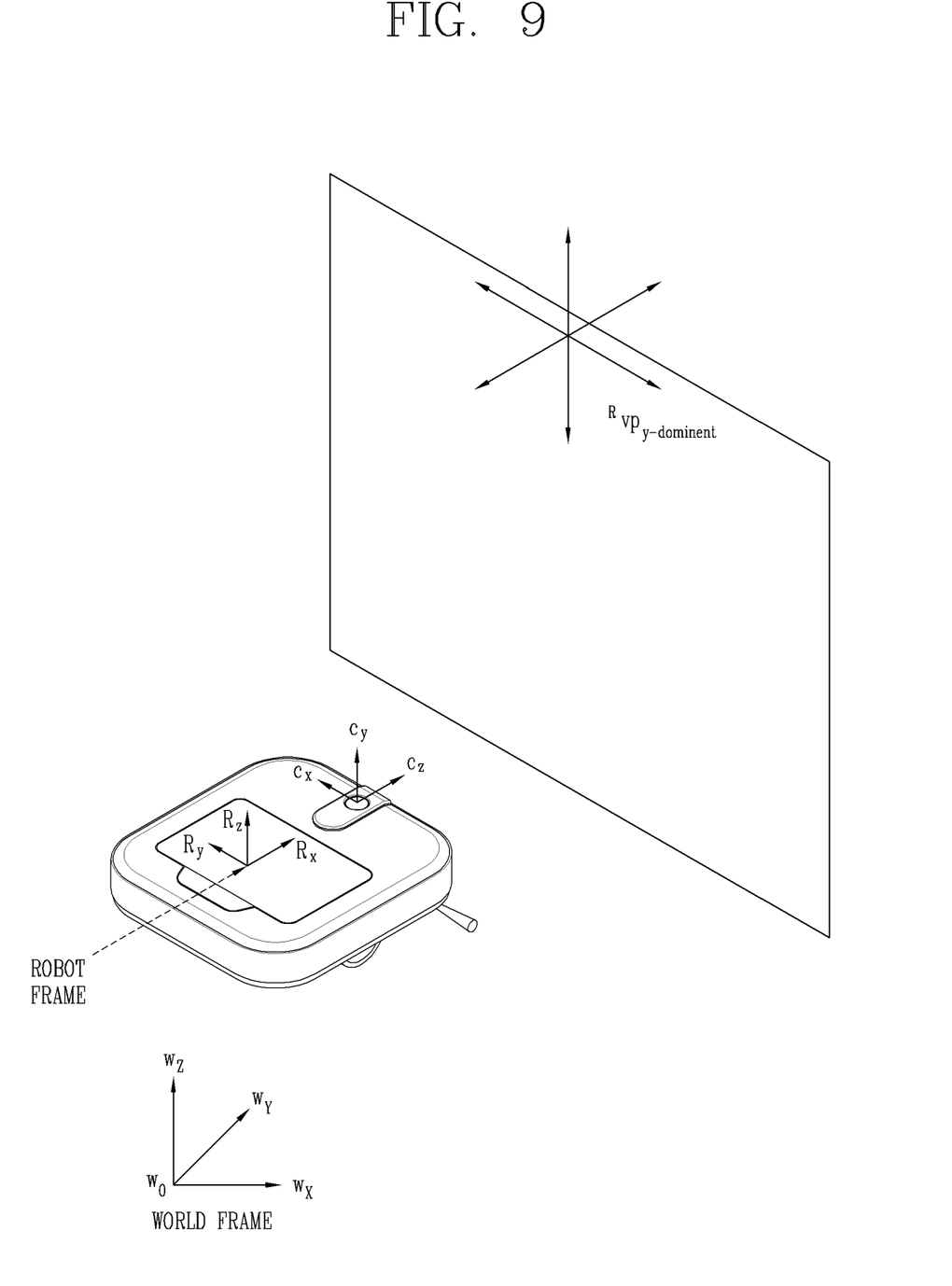
FIG. 9 is a conceptual diagram showing a 3D coordinate system used by a controller of a robot according to the present disclosure.

Meanwhile, the preset 3D coordinate system is shown in FIG. 9.

In one example, the preset 3D coordinate system (Cx, Cy, Cz) may be defined by the camera installed in the main body. For reference, although the camera is shown to face the ceiling in FIG. 9, the embodiment according to the present disclosure is not limited thereto.

In addition to the 3D coordinate system defined by the camera, the controller 1800 may use a coordinate system Rx, Ry, Rz defined by the main body of the robot or may use the global coordinate system Wx, Wy, Wz corresponding to a cleaning area in which the main body is located.

Such a vanishing point may be positioned inside the image acquired by the camera or outside the image.

In addition, the controller 1800 may detect information related to a moving direction of the robot based on the detected vanishing point as described above (S503).

More specifically, the controller 1800 may generate a vanishing point vector using the detected vanishing point. The controller 1800 may calculate an angle formed by one of the vanishing point vectors and the moving direction of the robot.

That is, the controller 1800 may detect relative information related to the posture of the robot with respect to the vanishing point vector.

In one embodiment, the controller 1800 may select any of the vanishing point vectors corresponding to the respective groups based on a normal vector of a wall surface located in the moving direction of the main body. In addition, the controller 180 may calculate an angle formed by the selected vanishing point vector and the moving direction of the robot.

In one example, the selected vanishing point vector may form a predetermined angle with the normal vector of wall surface positioned in the moving direction of the robot.

In another example, the controller 1800 may select a vanishing point vector closest to 90 degrees with the normal vector of the wall surface located in the moving direction of the main body among the vanishing point vectors corresponding to each group.

In another example, the controller 1800 may select any one vanishing point vector having a largest horizontal vector component of the image among the vanishing point vectors corresponding to each group. That is, the controller 1800 may select a vanishing point vector closest to the horizontal direction of the acquired image among the vanishing point vectors corresponding to the respective groups.

In another example, the controller 1800 may select any one of the remaining two vanishing point vectors, excluding the vanishing point vector closest to a vertical direction of the acquired image among the vanishing point vectors corresponding to the respective groups.

The controller 1800 may detect information related to a posture of the robot based on the detected moving direction of the robot and a movement record of the robot (S504).

Specifically, based on the movement record of the robot, the controller 1800 may compare the global coordinate system corresponding to the cleaning area where the robot body is located and the preset 3D coordinate system, and may detect a direction in which the robot is directed on the global coordinate system based on the comparison result and the detected vanishing point.

That is, the controller 1800 may calculate a difference between the global coordinate system and the preset 3D coordinate system. The controller 1800 may detect information related to the posture of the robot in the global coordinate system based on the calculated difference.

For example, the controller 1800 may detect information related to the moving direction of the robot from the global coordinate system based on the difference between the global coordinate system and the preset 3D coordinate system and the angle between the vanishing point vector and the moving direction of the robot.

Figure 6:
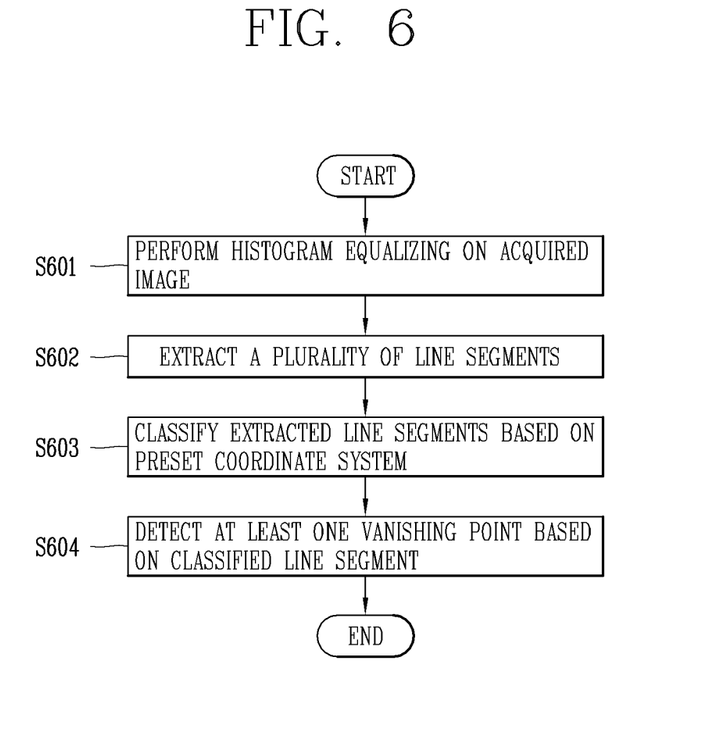
FIG. 6 is a flow chart illustrating a method of controlling a moving robot according to another embodiment of the present disclosure.

In the following FIG. 6, a specific method for detecting a vanishing point from an image by the controller 1800 of the according to the present disclosure will be described.

The controller 1800 may perform histogram equalizing on the acquired image (S601).

In particular, if it is determined that brightness of the acquired image is less than a preset brightness level, the controller 1800 may perform histogram equalizing on the acquired image. For example, the controller 1800 may calculate an average illumination value per pixel of the acquired image, and may perform histogram equalizing on the acquired image if the calculated average illumination value is lower than a preset illumination value.

Thus, the controller 1800 of the robot according to the present disclosure may effectively extract the line segment from the image acquired in a low-illuminance environment.

The controller 1800 may extract a plurality of line segments from the acquired image (S602).

Specifically, the controller 1800 may extract a plurality of feature points from the acquired image, and may extract a line segment by connecting some of the feature points. Further, the controller 1800 may correct the segment by extending the segments extracted by connecting the feature points.

The controller 1800 may classify the plurality of extracted line segments based on a preset 3D coordinate system (S603).

That is, the controller 1800 may classify a plurality of line segments detected based on the preset 3D coordinate system into three groups.

In one embodiment, the controller 1800 may use a RANSAC (Random Absolute Consensus) algorithm to classify a plurality of line segments. When the RANSAC algorithm is used, the controller 1800 may classify line segments substantially parallel to each other in the 3D space corresponding to the image among the plurality of line segments into one group.

For example, the three groups may correspond to coordinate axes of a preset 3D coordinate system, respectively.

Further, the controller 1800 may detect at least one vanishing point based on the classified line segment (S604).

Specifically, the controller 1800 may detect information related to a contact point where extension lines of line segments classified into a group meet, and determine the contact point as a vanishing point. The controller 1800 may detect a vanishing point for each group of the classified line segments. Therefore, the number of vanishing points may be matched with the number of classified groups of the line segments.

Also, the controller 1800 may detect coordinate information of the vanishing point corresponding to each group by using the line segments included in each group. At this time, the coordinate information of the vanishing point may be 2D coordinate information.

That is, the controller 1800 may detect coordinate information of a contact point where extension lines of line segments classified as a group meet as coordinate information of the vanishing point.

Meanwhile, the vanishing point may be located inside the image or outside the image.

In addition, the controller 1800 may detect a vanishing point vector corresponding to each group using the coordinate information of the vanishing point corresponding to each group.

As described above, since each group corresponds to a coordinate axis of a preset 3D coordinate system, the detected vanishing point vector may correspond to each coordinate axis.

In one embodiment, the vanishing point vector may be 3D information. That is, the controller 1800 may convert the coordinate information of the vanishing point, which is 2D information, into a vanishing point vector that is 3D information.

A method of detecting a vanishing point from an image by the controller of the robot according to the present disclosure will be described with reference to FIGS. 7A to 7C.

Figure 7A:
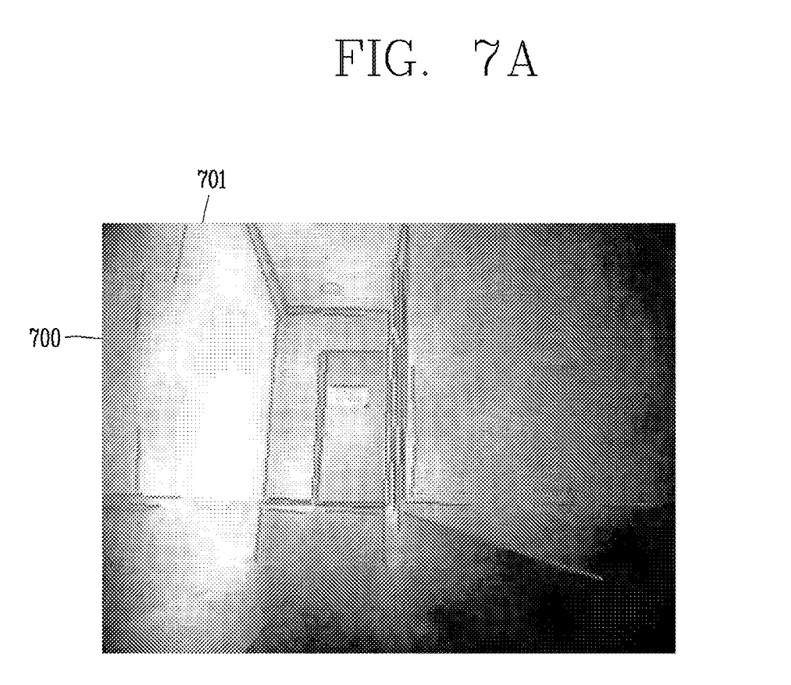
FIGS. 7A to 7C are conceptual diagrams illustrating a method of detecting a vanishing point from an image by a controller of a robot according to the present disclosure.

Referring to FIG. 7A, the controller 1800 may detect a feature point aggregate 701 from an acquired image 700. The feature point aggregate 701 may be a set of a plurality of feature points extracted from the image 700.

Figure 7B:
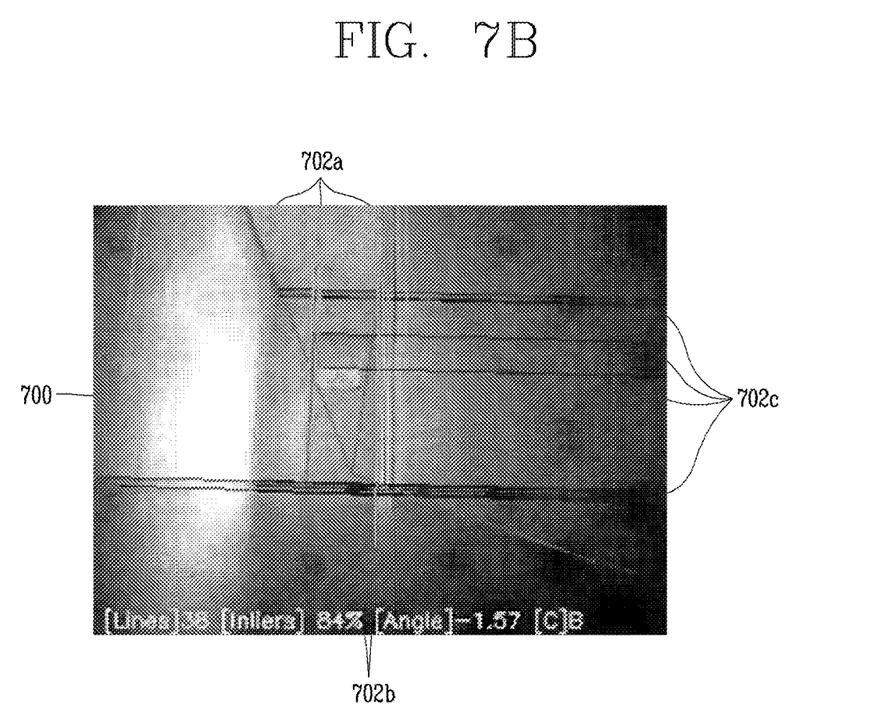

Referring to FIG. 7B, the controller 1800 may extract a plurality of line segments 702a, 702b, and 702c from the image 700 using the feature point aggregate 701. Then, the controller 1800 may classify the plurality of line segments 702a, 702b, and 702c based on a preset 3D coordinate system defined by an optical axis of the camera.

For example, the controller 1800 may classify the plurality of line segments 702a, 702b, and 702c into a first line segment group 702a, a second line segment group 702b, and a third line segment group 702c so that some of the plurality of line segments 702a, 702b, and 702c correspond to three coordinate axes forming the 3D coordinate system.

Figure 7C:
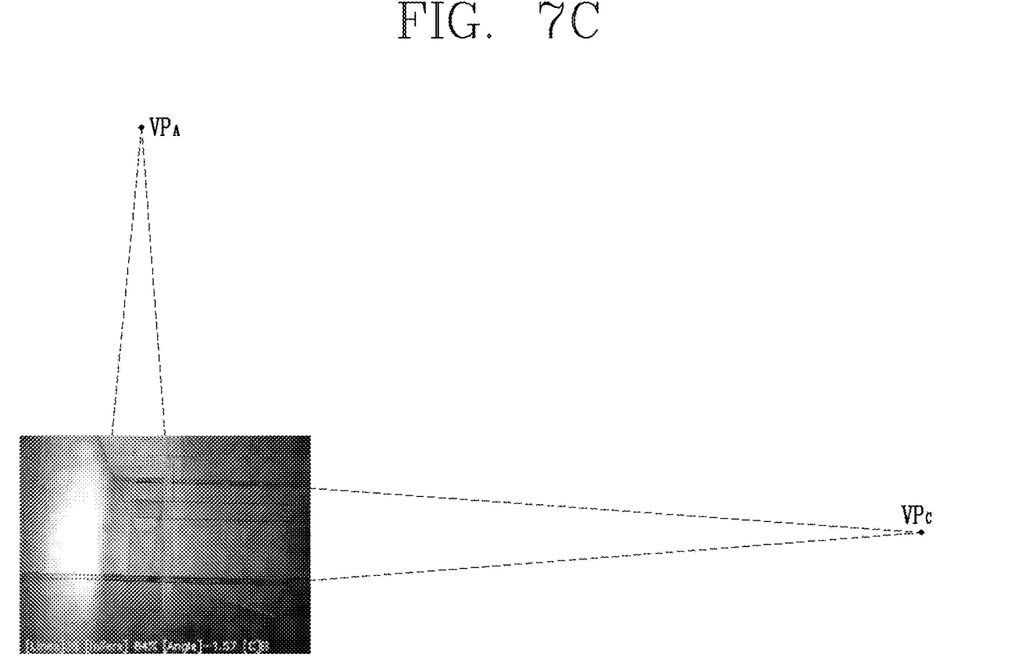

Referring to FIG. 7C, the controller 1800 may detect vanishing points VPA, VPB, and VPC corresponding to the respective groups by using the line segments included in each group.

Specifically, the controller 180 may determine a contact point of the extension lines of the line segments included in the first line segment group 702a is a first vanishing point VPA. Similarly, the controller 1800 may detect the contact points of the extension lines of the line segments included in the second and third line segment groups 702b and 702c as the second and third vanishing points VPB and VPC, respectively.

A method of detecting information related to a posture of the robot using a vanishing point vector by the controller 1800 of the robot according to the present disclosure will be described with reference to FIG. 8.

Figure 8:
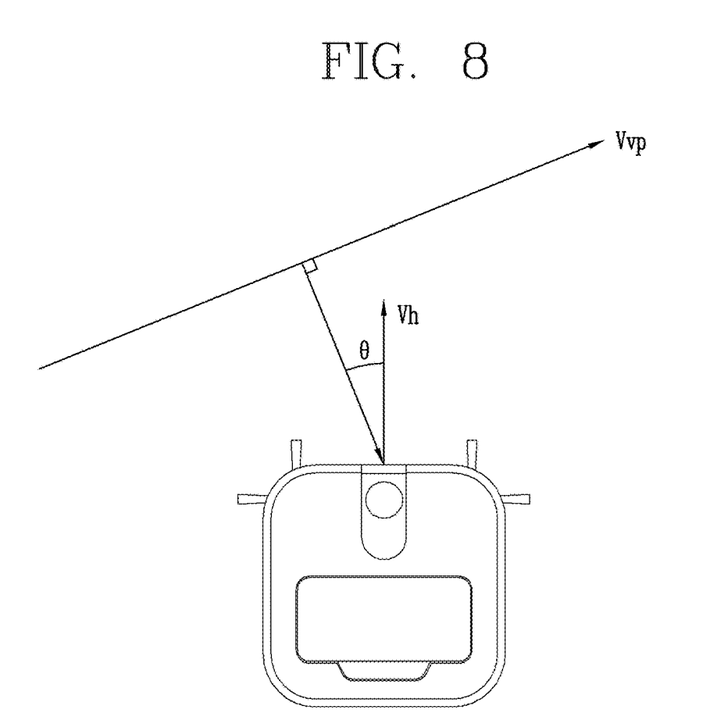
FIG. 8 is a conceptual diagram illustrating a method of detecting a direction of a robot by using a vanishing point vector by a controller of the robot according to the present disclosure.

Referring to FIG. 8, the controller 1800 may select any one Vvp of vanishing point vectors corresponding to the respective groups based on the normal vector of the wall surface located in the moving direction Vh of the main body. In addition, the controller 180 may calculate an angle θ formed by the selected vanishing point vector Vvp and the moving direction Vh of the robot.

According to embodiments of the present disclosure, since an obstacle may be detected only through a single camera. manufacturing cost of the moving robot may be reduced.

In addition, the moving robot according to the present disclosure may have enhanced performance in detecting an obstacle by using a monocular camera.

Also, the moving robot according to the present disclosure may accurately detect an obstacle, regardless of an installation state of the camera.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A cleaner comprising:
   a main body having a suction port;
   a cleaning unit provided in the main body to suck a cleaning object through the suction port;
   a driving unit to move the main body;
   a camera provided in the main body and photographing an image; and
   a controller detecting a vanishing point related to the image and detecting information related to a posture of the main body based on the detected vanishing point,
   wherein the controller is configured to:
   detect a plurality of line segments from the image;
   classify the plurality of detected line segments into three groups;
   detect a vanishing point vector corresponding to each group; and
   select any one of the vanishing point vectors corresponding to each group based on a normal vector of a wall surface located in a moving direction of the main body, and calculate an angle formed by the selected vanishing point vector and the moving direction of the main body.

2. The cleaner of claim 1, wherein
   the controller detects a vanishing point related to the image using the plurality of detected line segments.

3. The cleaner of claim 2, wherein
   the controller classifies the plurality of detected line segments into three groups based on a preset three-dimensional (3D) coordinate system, and detects coordinate information of a vanishing point corresponding to each group using the line segments included in each group.

4. The cleaner of claim 3, wherein the coordinate information of the vanishing point is two-dimensional (2D) coordinate information.

5. The cleaner of claim 3, wherein the controller uses a random sample consensus (RANSAC) algorithm to classify the plurality of line segments.

6. The cleaner of claim 3, wherein the three groups correspond to coordinate axes of the 3D coordinate system, respectively.

7. The cleaner of claim 3, wherein the controller detects a vanishing point vector corresponding to each group using coordinate information of the vanishing point corresponding to each group.

8. The cleaner of claim 7, wherein the vanishing point vector is 3D information.

9. The cleaner of claim 7, wherein the controller calculates an angle formed by any one of the vanishing point vectors corresponding to each group and the moving direction of the main body.

10. The cleaner of claim 9, wherein the controller selects any one vanishing point vector having a largest horizontal direction vector component of the image among the vanishing point vectors corresponding to each group, and calculates an angle formed by the selected vanishing point vector and the moving direction of the main body.

11. The cleaner of claim 3, wherein the preset 3D coordinate system is defined by a direction in which an optical axis of the camera is directed.

12. The cleaner of claim 11, wherein the controller compares a global coordinate system corresponding to a cleaning region in which the main body is located and the preset 3D coordinate system, and detects a direction in which the main body is directed on the global coordinate system on the basis of the comparison result and the vanishing point coordinate information.

13. The cleaner of claim 1, wherein the selected vanishing point vector forms a predetermined angle with the normal vector of the wall surface.

14. The cleaner of claim 1, wherein the camera is installed at one point of the main body such that the direction in which an optical axis of the camera is directed is fixed.

15. The cleaner of claim 1, wherein the controller performs histogram equalizing on the image before detecting the vanishing point.

* * * * *